United States Patent [19]

Takeuchi et al.

[11] Patent Number: 4,740,734
[45] Date of Patent: Apr. 26, 1988

[54] CONTROL APPARATUS FOR BRUSHLESS DC MOTORS

[75] Inventors: Kanji Takeuchi, Gamagori; Masami Nagata, Okazaki, both of Japan

[73] Assignee: Nippondenso Co., Ltd., Kariya, Japan

[21] Appl. No.: 93,757

[22] Filed: Sep. 8, 1987

[30] Foreign Application Priority Data

Sep. 9, 1986 [JP] Japan ................. 61-212499

[51] Int. Cl.$^4$ .............................. H02P 6/02
[52] U.S. Cl. ..................... 318/254; 318/138
[58] Field of Search ............. 318/138, 254, 439

[56] References Cited

U.S. PATENT DOCUMENTS

| 4,250,435 | 2/1981 | Alley et al. | 318/254 X |
| 4,409,524 | 10/1983 | Nielsen et al. | 318/138 |
| 4,455,513 | 6/1984 | Fulton et al. | 318/254 X |
| 4,495,450 | 1/1985 | Tokizaki et al. | 318/138 |

FOREIGN PATENT DOCUMENTS 55-160980 12/1980 Japan.
57-173385 10/1982 Japan.

OTHER PUBLICATIONS

"Brushless Motor Drive for In-Tank Fuel Pump", General Motors Research Laboratories, 840445, pp. 57-63.
"P.M. Brushless Motor Drives", Proc. Annu. Symp. Incremental Motion Control System Devices, 9th., pp. 315-312.
"Microcomputer-Controlled Brushless Motor Without a Shaft-Mounted Position Sensor", Ipec-Tokyo 1983 pp. 1477-1488.

Primary Examiner—Bentsu Ro
Attorney, Agent, or Firm—Cushman, Darby & Cushman

[57] ABSTRACT

A control apparatus for a brushless dc motor comprises: a parallel connection circuit including a plurality of series circuits connected in parallel; each series circuit having one armature coil and one field-effect transistor, one end of the parallel connection circuit being connected to one end of a dc power source; a free-wheeling diode connected across the parallel connection circuit; first semiconductor switch means connected between the other end of the parallel connection circuit and the other end of the dc power source; a plurality of second semiconductor switch means connected between respective gates of the field-effect transistors; and the one end of the dc power source; a plurality of reverse current blocking elements for preventing reverse currents from flowing into the second semiconductor switch means from the gates of the field-effect transistors; a plurality of comparators for detecting induced voltages developed across the armature coils; a drive circuit responsive to detection output signals from the comparators for sequentially driving the second semiconductor switch means so that the field-effect transistors are turned on and off to sequentially control the energization of the armature coils; and a rotor comprising a permanent magnet having a plurality of magnetic poles which is driven by magnetic fields produced by the sequential energization of the armature coils.

4 Claims, 3 Drawing Sheets (A) PWM CONTROL TRANSISTOR DRIVE SIGNAL (B) GATE-SOURCE VOLTAGE $V_{GS}$ OF MOSFET 21

CONTROL APPARATUS FOR BRUSHLESS DC MOTORS

BACKGROUND OF THE INVENTION

1. Field of the Invention

The present invention relates to a control apparatus for brushless dc motors and more particularly to a control apparatus for a brushless dc motor which is designed so that an electric current flowing through each of the armature coils of the brushless dc motor is chopper-controlled. "A brushless dc motor" is hereinafter referred to simply as "a brushless motor".

2. Description of the Related Art

A control apparatus for a brushless motor is known in the art in which respective series circuits of armature coils 2a, 2b and 2c for respective phases of the brushless motor and power transistors 3a, 3b and 3c are connected across a dc power source 1, as shown in FIG. 5.

Further, series circuits of control transistors 4a, 4b and 4c for respectively controlling the power transistors 3a, 3b and 3c and resistors 5a, 5b and 5c are connected between a positive terminal of the dc power source 1 and respective bases of the power transistors 3a, 3b and 3c.

In FIG. 5, reference numeral 6 designates a comparator, which has its negative signal input terminal 6a connected to the junction point between the positive terminal of the dc power source 1 and one end of the armature coil 2c and has its positive signal input terminal 6b connected to the other end of the armature coil 2c. As power supply to the comparator 6, its positive power input terminal 6c is connected to a constant voltage circuit 7 and its negative power input terminal 6d is connected to the negative terminal of the dc power source 1. Thus, the output of the constant voltage circuit 7 is connected, as a single positive voltage supply, only to the positive power input terminal 6c of the comparator 6 to thereby reduce the cost. It should be noted that, while FIG. 5 shows that the signal input terminals of the comparator 6 are connected only across the armature coil 2c, a similar comparator (not shown) is connected across each of the other armature coils 2a and 2b.

Reference numeral 8 designates a base drive circuit which receives the outputs of the comparators 6 and drives the control transistors 4a, 4b and 4c, respectively.

Reference numeral 9 designates a two-pole rotor composed of a permanent magnet having S and N poles.

Here, the method of driving the rotor 9 is known from Japanese Unexamined Patent Publications No. 55-160980 and No. 57-173385, for example. In the method disclosed therein, a time point, where positive-to-negative or negative-to-positive transistion occurs in an induced voltage in each of the armature coils 2a, 2b and 2c, is detected by the comparator 6 and the detection outputs therefrom are applied to the base drive circuit 8. In response to the detection outputs from the comparators 6, the base drive circuit 8 sequentially drives the control transistors 4a, 4b and 4c so that the control transistors 4a, 4b and 4c respectively switch electric currents flowing through the armature coils 2a, 2b and 2c, thereby driving the rotor 9 to rotate. Thus, the rotational position of the rotor 9 is detected by using the induced voltages in the armature coils 2a, 2b and 2c, and hence there is no need to use Hall generators or the like in order to detect the rotational position of the rotor 9.

In addition, a chopper circuit 10 is connected between the dc power source 1 and the respective phase armature coils 2a, 2b and 2c. The chopper circuit 10 comprises a power transistor 11, a free-wheeling diode 12 connected in parallel with the respective series connection circuits composed of the armature coils 2a, 2b and 2c and the power transistors 3a, 3b and 3c, and a chopper control circuit 13 for driving the base of the power transistor 11 at a given duty cycle. With this construction, the voltages applied to the respective phase armature coils 2a, 2b and 2c can be varied by the PWM control performed by the chopper circuit 10, whereby a variable speed operation of the brushless motor can be effected through the speed range from a lower speed to a high speed.

With this conventional control apparatus, however, mere provision of the chopper circuit 10 for effecting a variable speed operation has disadvantages such as described hereunder.

(a) As the PWM control is performed, a voltage across the free-wheeling diode 12 which provides a reference level for the induced voltages in the armature coils 2a, 2b and 2c varies in the positive and negative directions. In other words, when the power transistor 11 is turned on, the positive power supply voltage $E_B$ of the dc power source 1 is applied across the free-wheeling diode 12, but when the power transistor 11 is turned off, due to the winding inductance of the armature coil 2a, an electric current is caused to flow through the free-wheeling diode 12. Consequently, a negative voltage corresponding to a voltage drop caused by the electric current flowing through the free-wheeling diode 12 in the forward direction appears on the side of the cathode terminal of the free-wheeling diode 12 with respect to the GND terminal of the dc power source 1.

Therefore, the voltage waveform appearing between the point A in FIG. 5 and the GND (ground), which provides a reference level for the discrimination of the induced voltages in the armature coils 2a, 2b and 2c, is affected by the switching waveform which functions as an in-phase noise signal, as described above.

(b) Since the potential at the point A in FIG. 5 becomes negative when the free-wheeling diode 12 is turned on, as mentioned above, the mere connection of the single positive voltage supply, as a power supply input, to the positive power input terminal 6c of the comparator 6 does not allow the comparator 6 to perform an accurate operation due to the above-mentioned negative potential, and, as a result, it becomes impossible to determine the rotational position of the rotor 9.

(c) As mentioned above, it is not possible for the connectional apparatus shown in FIG. 5 to effect the desired PWM control of the voltages applied the respective armature coils of the brushless motor without needing the use of separate sensors for detecting the rotational position of the rotor 9.

SUMMARY OF THE INVENTION

Accordingly, it is a primary object of the present invention to overcome the foregoing deficiencies of the prior art control apparatus.

It is another object of the present invention to provide a control apparatus for a brushless dc motor including: a dc power source; a parallel connection circuit of a plurality of series circuits, each of which is composed of one of armature coils of a stator of the brushless dc motor and one of a plurality of field-effect transistors, one end of the parallel connection circuit being connected to one end of the dc power source; a freewheeling diode connected across the parallel connection circuit; first semiconductor switch means connected between the other end of the parallel connection circuit and the other end of the dc power source; a chopper control circuit for turning on and off the first semiconductor switch means at a first conduction frequency, a plurality of second semiconductor switch means connected between respective gates of the field-effect transistors and the one end of the dc power source to control the operation of the gates; a plurality of reverse current blocking means connected respectively between the second semiconductor switch means and the gates of the field-effect transistors to prevent reverse currents from flowing into the second semiconductor switch means from the gates of the field-effect transistors; a plurality of comparators each of which has two signal input terminals connected to both ends of one of the armature coils to detect an induced voltage generated therein; a drive circuit responsive to detection output signals from the comparators for sequentially driving the second semi-conductor switch means at a second conduction frequency to turn on and off the field-effect transistors, thereby controlling sequential energization of the armature coils; and a rotor comprising a permanent magnet having a plurality of magnetic poles which is driven by magnetic fields produced by the sequential energization of the armature coils.

A feature of the operation of the control apparatus for a brushless dc motor of the present invention resides in that the capacitance existing between the gate and source of each of the field-effect transistors is utilized so that each of the field-effect transistor is turned on by an electric charge stored in the capacitance from the dc power source.

From the foregoing description, it will be seen that, since the present invention makes use of the field-effect transistors to switch on and off electric currents supplied to the armature coils from one end of the dc power source, the operation of each of the field-effect transistors is not affected by the turning on and off of the first semiconductor switch means by the chopper control circuit. As a result, it is possible to connect the first semiconductor switch means between each of the field-effect transistors and the other end of the dc power source and thus to always provide an accurate voltage as a reference level for the comparator. Thus, the present invention has a great advantage of assuring accurate driving of a brushless motor.

DESCRIPTION OF THE PREFERRED EMBODIMENTS

Figure 1:
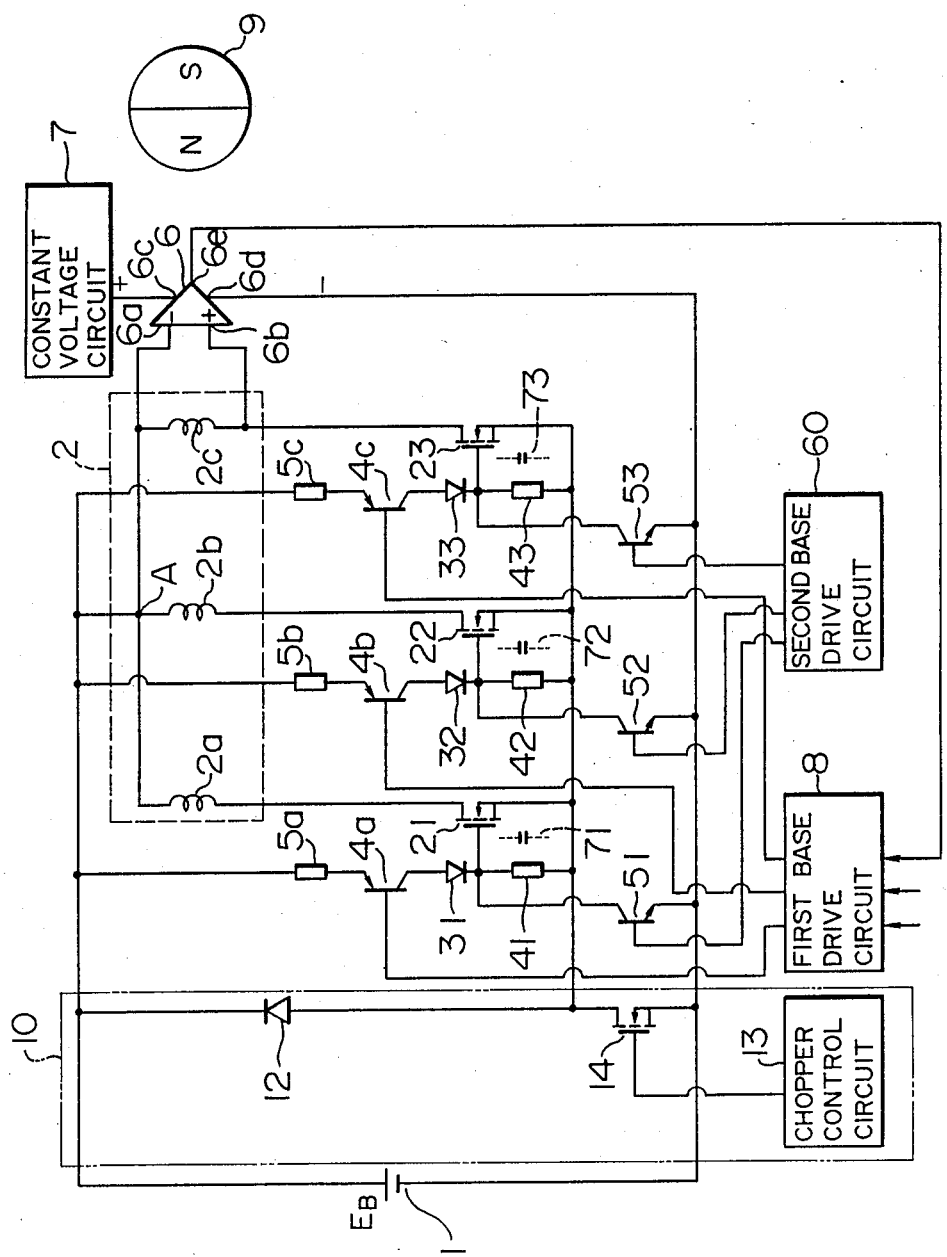
FIG. 1 is an electric circuit diagram showing a control apparatus for a brushless dc motor according to an embodiment of the present invention.
Figure 5:
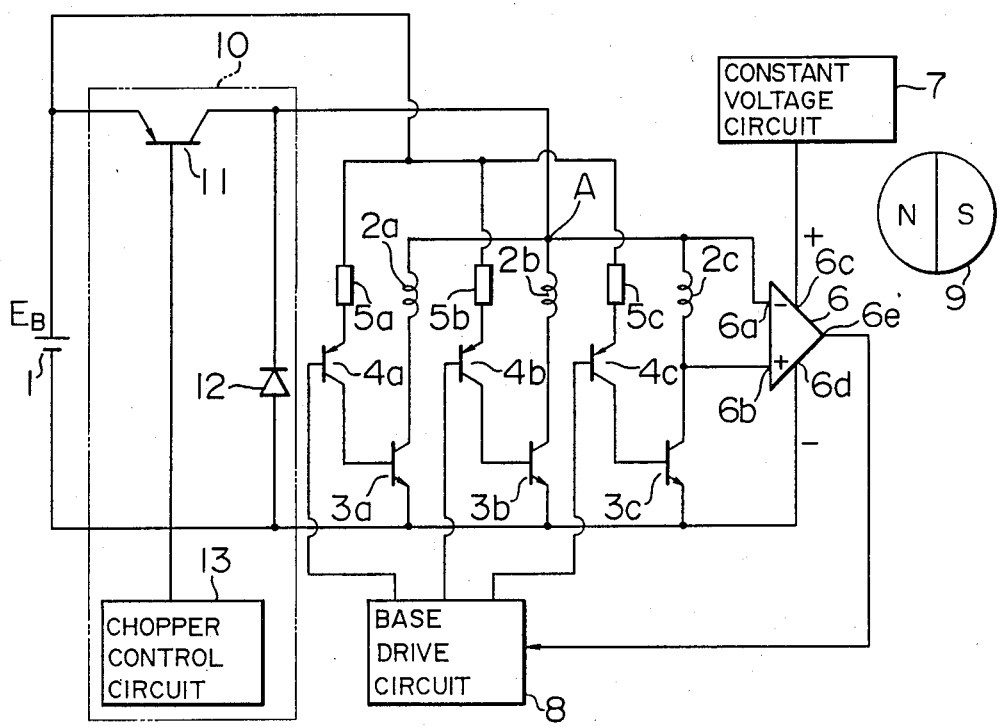
FIG. 5 is an electric circuit diagram showing a conventional control apparatus for a brushless dc motor.

The present invention will now be described with reference to the illustrated embodiment. In FIG. 1, the reference numerals same as those used in FIG. 5, which shows the conventional apparatus, are used to show the same component parts. It should be noted that, while, in the conventional apparatus shown in FIG. 5, three base voltage controlled type bipolar transistors are used as the power transistors 11, 3a, 3b and 3c, in the control apparatus of the present invention shown in FIG. 1, three gate voltage controlled type MOSFET's (field-effect transistors) 14, 21, 22 and 23 are used. Further, the PWM control transistor 14 in the present invention is connected between the sources of the MOSFET's 21, 22 and 23 and the ground (GND) terminal of the dc power source 1. Reference numerals 41, 42 and 43 designate current limiting resistors for use in the charging and discharging operation of the gate-source capacitance (GS) of the MOSFET's 21, 22 and 23, respectively. The respective combinations of the transistors 4a, 4b and 4c and the transistors 51, 52 and 53 operate to control the gates of the associated MOSFET's 21, 22 and 23, respectively, and these transistors are rated for small signals of the order of several tens mA. Reference numeral 8 designates a first base drive circuit which receives the outputs of the comparators 6 and drives the control transistors 4a, 4b and 4c. Reference numerals 31, 32 and 33 designate diodes for preventing reverse currents from flowing into the transistors 4a, 4b and 4c, respectively. Reference numeral 60 designates a second base drive circuit for driving the control transistors 51, 52 and 53.

Figure 2:
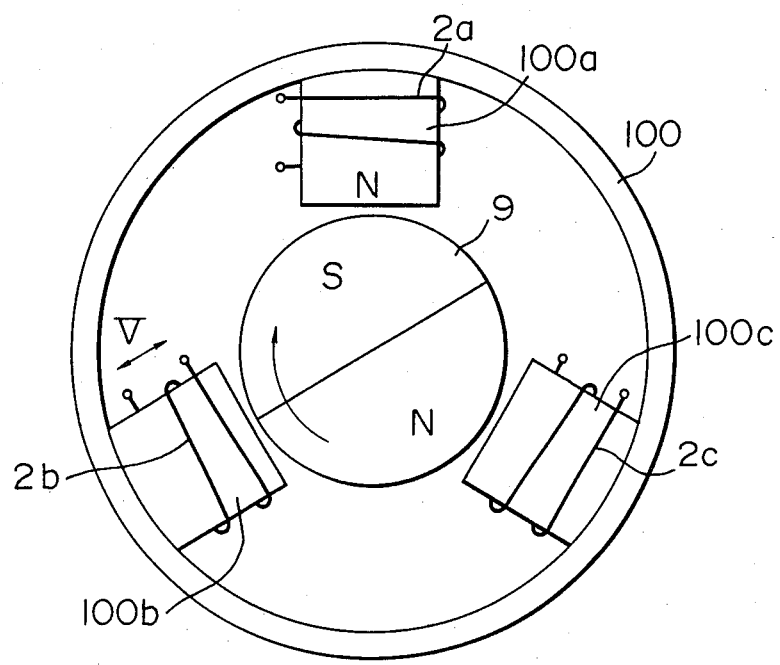
FIG. 2 is a schematic structural drawing which is used in explaining the control operation of a brushless dc motor.

FIG. 2 is a schematic structural drawing showing a brushless dc motor, which shows that three cores 100a, 100b and 100c are arranged at equal spatial intervals on the inner periphery of a yoke 100 and the armature coils 2a, 2b and 2c are wound respectively on the cores 100a, 100b and 100c. Reference numeral 9 designates a two-pole rotor comprising a permanent magnet having N and S magnetic poles. When the S magnetic pole of the rotor 9 is attracted by the N magnetic pole of the core 100a produced by the armature coil 2a to cause the rotor 9 to rotate, voltages V are induced in the remaining armature coils 2b and 2c, respectively. In this way, when the rotor 9 is rotated, by detecting the polarity of the voltages induced in the armature coils 2a, 2b and 2c, while they are deenergized, by the comparators 6, it is possible to determine the rotational position of the rotor 9. Then, the detection output signals from the comparators 6 are applied to the first base drive circuit 8 so that, in accordance with the position of the rotor 9 indicated by the detection output signals of the comparators 6, the first base drive circuit 8 sequentially drives the control transistors 4a, 4b and 4c thereby to sequentially supply electric currents flowing through the armature coils 2a, 2b and 2c. The electric currents flowing through the armature coils 2a, 2b and 2c sequentially energize the cores 100a, 100b and 100c, whereby the N magnetic pole is produced in the core 100a as shown in FIG. 2, for example, and the rotor 9 is rotated by this energization as shown in FIG. 2.

The chopper control circuit 13 operates to turn on and off the PWM control transistor 14 at a first duty cycle, so that the voltages applied to the armature coils 2a, 2b and 2c may be varied to thereby effect a variable speed operation in the rotational speed range from a low rotational speed to a high roltational speed.

Thus, according to the present invention, the potential at the point A shown in FIG. 1 which provides the reference level for the induced voltage determination by the comparators 6 is always maintained to be same with the positive terminal potential $E_B$ of the dc power source 1. As a result, there occur no problems such as in-phase noise and a negative potential appearing at the point A which were described as the drawbacks of the prior art control apparatus. Therefore, the present invention can assure accurate driving of a brushless dc motor, while performing the PWM control.

Figure 3A:
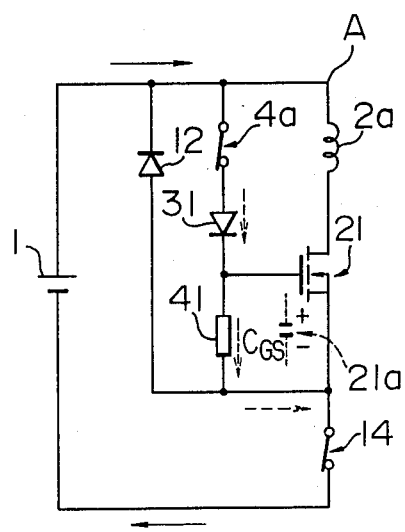
FIGS. 3A and 3B are equivalent circuit diagrams which are used in explaining the operation of the MOSFET 21 when the PWM control transistor 14 is in the conductive and nonconductive states, respectively.

Next, the driving of the MOSFET's 21, 22 and 23 performed while the PWM control transistor 14 is turned on and off will now be described with reference to FIGS. 3A and 3B. FIG. 3A illustrates an equivalent circuit when the PWM control transistor 14 is turned on by the control signal from the chopper control circuit 13.

When the control transistor 4a is driven into the conductive state by a drive signal from the first base drive circuit 8, as shown by the dotted lines in FIG. 3A, a charging current flows into the capacitance $C_{GS}$ of a capacitor 21a, which exists inherently between the gate and source of the MOSFET 21, through a circuit path including the dc power source 1, the transistor 4a, the diode 31, the capacitor 21a and the PWM control transistor 14, and the charging of the capacitance $C_{GS}$ of the capacitor 21a raises the gate-source voltage $V_{GS}$ up to the voltage $E_B$ of the dc power source 1. Then, as the gate-source capacitance $C_{GS}$ of the capacitor 21a in the MOSFET 21 is charged to exceed the gate threshold voltage $V_{GS}(th)$ of the MOSFET 21, the MOSFET 21 is turned on and causes an excitation current to flow through the armature coil 2a.

Figure 3B:
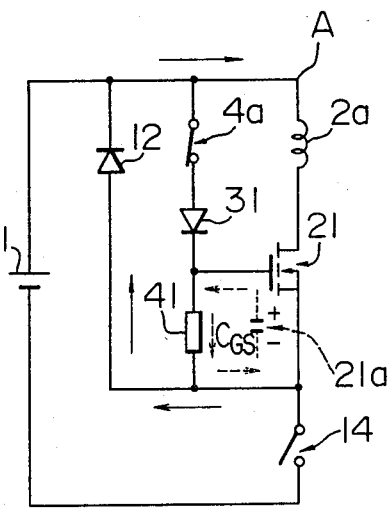

On the other hand, FIG. 3B shows a state where the PWM control transistor 14 is turned off by the control signal from the chopper control circuit 13.

In this case, the gate-source capacitance $C_{GS}$ of the capacitor 21a is not charged but is discharged through the resistor 41 as shown by the dotted lines in FIG. 3B, so that the gate-source voltage $V_{GS}$ falls slowly at the time constant of $(C_{GS}) \times (R_{41})$.

Figure 4:
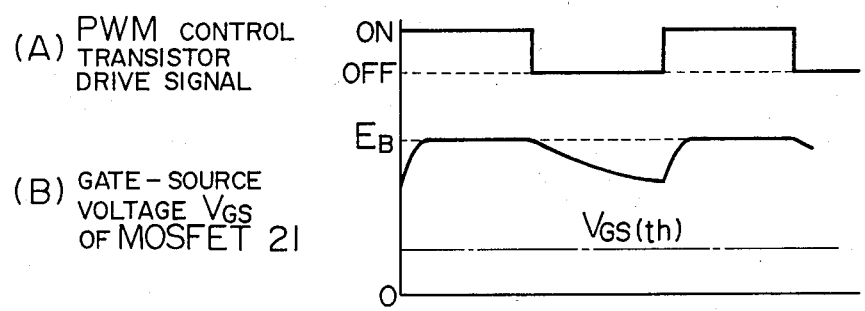
FIGS. 4(A) and (B) show waveforms at various portions of the control apparatus of the present invention shown in FIG. 1.

FIGS. 4(A) and (B) show the variations of the gate-source voltage $V_{GS}$ of the MOSFET 21 caused by the switching of the PWM control transistor 14 in the above-mentioned operations. The waveform of $V_{GS}$ can be changed by selecting the value of the resistor $R_{41}$, and the level of $V_{GS}$ can be maintained to be higher than the gate threshold voltage $V_{GS}(th)$ of the MOSFET 21 as shown in FIG. 4(B). Thus, so far as the control transistor 4a is driven into the conductive state by the driving signal from the first base drive circuit 8, the conductive state of the MOSFET 21 can be maintained regardless of the conductive or nonconductive state of the PWM control transistor 14.

The chopper frequency used for the PWM control is designed generally to be approximately 20 kHz which is in the high frequency range of the inaudible frequency band, whereas, the energization phase switching frequency used in the control apparatus for a brushless dc motor, etc. is selected to be in the order of several hundreds Hz. Thus, the PWM control frequency is about 100 times as high as the energization phase switching frequency. Consequently, when the control transistor 4a is driven into the nonconductive state by the driving signal from the first base drive circuit 8, a delay in the turning-off of the MOSFET 21 due to the slow change of the gate-source voltage $V_{GS}$ has substantially no influence on the delay in the energization phase switching operation, and the performance characteristics of the brushless dc motor are by no means affected thereby.

As described hereinabove, since the on-off operation of the MOSFET's 21, 22 and 23 can be effected by the first base drive circuit 8 independently of the conductive and nonconductive states of the PWM control transistor 14, it is possible to connect the PWM control transistor 14 between the MOSFET's 21, 22 and 23 and the negative terminal of the dc power source 1.

As a result, the negative reference level input terminals 6a of the comparators 6 are always connected to the positive terminal of the dc power source 1 and are always maintained at a constant level, so that the operation of the comparators 6, namely, the detection of the induced voltages in the armature coils 2a, 2b and 2c can be effected accurately, thereby making it possible to assure accurate determination of the rotational position of the rotor 9 and hence accurate driving of the rotor 9.

However, it is not possible to use conventional bipolar type transistors as the transistors 21, 22 and 23 in FIG. 1. For instance, if conventional NPN type transistors are used, it is not possible to form a closed circuit for supplying the base currents of the NPN type transistors due to the switching operation of the PWM control transistor 14.

As described hereinabove, the present invention contemplates to effectively utilize the characteristic structure of the MOSFET's (namely, the capacitance inherently existing between the gate and source thereof) so as to realize an accurate operating control apparatus for a brushless dc motor which can perform the PWM control by using a chopper control circuit.

While the charge stored in the gate-source capacitance $C_{GS}$ of each of the MOSFET's 21, 22 and 23 is discharged slowly through each of the resistors 41, 42 and 43, respectively, as described above, the transistors 51, 52 and 53 may be additionally connected between the gates of the MOSFET's 21, 22 and 23 and the ground line, as shown in FIG. 1, so that each of the transistors 51, 52 and 53 is turned on to rapidly discharge the charge stored in the gate-source capacitance $C_{GS}$ to thereby quickly turn off each of the MOSFET's 21, 22 and 23. Then, if the time delay in the turning-off operation of the MOSFET's 21, 22 and 23 when using the resistors 41, 42 and 43 alone gives rise to any inconvenience in driving the brushless dc motor at a high speed, the provision of the transistors 51, 52 and 53 can prevent such a time delay effectively by the turning-on operation thereof. On the contrary, if it is desired to increase the time delay, that is, when it is desired, for example, to improve the damping effect of a stepping motor by the overlapping of the phase currents of the stepping motor, respective capacitors 71, 72 and 73 may be connected between the gates and sources of the MOSFET's 21, 22 and 23 in parallel with the resistors 41, 42 and 43.

In FIG. 1, it is possible to drive the MOSFET's so long as there is provided a power source whose output voltage is higher than the MOSFET gate threshold voltage $V_{GS}(th)$ with respect to the GND potential. When the dc power source 1 has a high output voltage, it is general the case that there is provided a control circuit power source which uses a regulator, etc. and whose output voltage is selected to be higher than the gate threshold voltage $V_{GS}(th)$. Then, if the resistors 5a, 5b and 5c in FIG. 1 are separated from the dc power source 1 and if they are connected to the above-mentioned control circuit power source, it is possible to drive the MOSFET's independently of the high output voltage dc power source 1.

As described above, if the control apparatus is designed to drive the gates of the MOSFET's by the use of the above-mentioned control circuit power source, this control apparatus may be applied easily to applications using high voltages.

Further, it should be noted that, while the electric circuitry of FIG. 1 uses a MOSFET as the PWM control transistor 14, the MOSFET may be replaced by a bipolar type power transistor.

We claim:

1. A control apparatus for a brushless dc motor comprising:
   a dc power source;
   a parallel connection circuit including a plurality of series circuits connected in parallel, each said series circuit being comprised of one of a plurality of armature coils of a stator of the brushless dc motor and one of a plurality of field-effect transistors, one end of said parallel connection circuit being connected to one end of said dc power source;
   a free-wheeling diode connected across said parallel connection circuit;
   first semiconductor switch means connected between the other end of said parallel connection circuit and the other end of said dc power source;
   a chopper control circuit for turning on and off said first semiconductor switch means at a first conduction frequency;
   a plurality of second semiconductor switch means connected between respective gates of said field-effect transistors and said one end of said dc power source to control the operation of said gates of said field-effect transistors;
   a plurality of reverse current blocking means connected respectively between said second semiconductor switch means and said gates of said field-effect transistors to prevent reverse currents from flowing into said second semiconductor switch means from said gates of said field-effect transistors;
   a plurality of comparators each thereof having two signal input terminals connected to both ends of one of said armature coils to detect an induced voltage generated therein;
   a drive circuit responsive to detection output signals from said comparators for sequentially driving said second semiconductor switch means at a second conduction frequency to turn on and off said field-effect transistors, thereby controlling sequential energization of said armature coils; and
   a rotor comprising a permanent magnet having a plurality of magnetic poles which is driven by magnetic fields produced by the sequential energization of said armature coils.

2. A control apparatus according to claim 1, wherein the first conduction frequency of said chopper control circuit is selected to be sufficiently high as compared with the second conduction frequency of said drive circuit.

3. A control circuit according to claim 1, wherein one resistor and one capacitor are connected in parallel between the gate and source of each of said field-effect transistors.

4. A control apparatus according to claim 3, wherein third semiconductor switch means are connected respectively between said gates of said field-effect transistors and the other end of said dc power source to rapidly discharge electric charges stored in the gate-source capacitance of said field-effect transistors.

* * * * *